US012776648B2

(12) United States Patent
Stadler et al.

(10) Patent No.: US 12,776,648 B2
(45) Date of Patent: Oct. 27, 2026

(54) STABILIZING ELECTRICAL POWER IN AN ELECTRICAL GRID

(71) Applicant: ABB Schweiz AG, Baden (CH)

(72) Inventors: Raeto Stadler, Langnau am Albis (CH); Ralf Baechle, Weilheim (DE)

(73) Assignee: ABB SCHWEIZ AG, Baden (CH)

( * ) Notice: Subject to any disclaimer, the term of this patent is extended or adjusted under 35 U.S.C. 154(b) by 287 days.

(21) Appl. No.: 18/693,383

(22) PCT Filed: Oct. 19, 2021

(86) PCT No.: PCT/EP2021/078998
§ 371 (c)(1),
(2) Date: Mar. 19, 2024

(87) PCT Pub. No.: WO2023/066470
PCT Pub. Date: Apr. 27, 2023

(65) Prior Publication Data
US 2024/0396336 A1 Nov. 28, 2024

(51) Int. Cl.
*H02J 3/0014* (2026.01)
*H02J 3/18* (2006.01)

(52) U.S. Cl.
CPC .............. *H02J 3/0014* (2026.01); *H02J 3/18* (2013.01)

(58) Field of Classification Search
CPC .... H02J 3/0014; H02J 3/14; H02J 3/18; H02J 3/1864
USPC ........................................................ 323/209
See application file for complete search history.

(56) References Cited

U.S. PATENT DOCUMENTS 3,999,117 A * 12/1976 Gyugyi ................. H02J 3/1864 323/211
5,343,139 A 8/1994 Gyugyi et al.
5,485,075 A * 1/1996 Mori ......................... H02J 3/18 323/205
(Continued)

FOREIGN PATENT DOCUMENTS

CN 104466991 A 3/2015
CN 112736920 A 4/2021
(Continued)

OTHER PUBLICATIONS

Indian Office Action; Application No. 202447031031; Mailing Date: Feb. 24, 2026; 7 Pages.
(Continued)

*Primary Examiner* — Yemane Mehari
(74) *Attorney, Agent, or Firm* — Greenberg Traurig, LLP

(57) ABSTRACT

A method for stabilizing electrical power in an electrical grid including: detecting a reduced power demand in the electrical grid; determining an active power and a reactive power to be compensated in the electrical grid; and compensating at least a part of the active power and at least a part of the reactive power by controlling a power compensating circuit connected to the electrical grid. The power compensating circuit including an at least resistive load connectable to the electrical grid via semiconductor switches. A compensated active power and a compensated reactive power is adjusted by setting switching angles of the semiconductor switches with respect to a phase angle of a grid voltage in the electrical grid.

20 Claims, 4 Drawing Sheets

(56) References Cited

U.S. PATENT DOCUMENTS

| | | | | |
|---|---|---|---|---|
| 5,672,956 | A * | 9/1997 | Fukui | H02J 3/1864 323/210 |
| 7,245,037 | B2 * | 7/2007 | Angquist | H02J 3/1835 322/29 |
| 2012/0080420 | A1 | 4/2012 | Hui et al. | |
| 2018/0323618 | A1 * | 11/2018 | Wagoner | H02J 3/18 |
| 2021/0364556 | A1 * | 11/2021 | Imabayashi | G01R 19/2513 |

FOREIGN PATENT DOCUMENTS

| | | | |
|---|---|---|---|
| CN | 113422369 | A | 9/2021 |
| JP | 55066284 | A | 5/1980 |
| JP | 04096625 | A | 3/1992 |
| JP | 10323048 | A | 12/1998 |
| JP | 11052518 | A | 2/1999 |
| JP | 11215709 | A | 8/1999 |
| JP | 2008237018 | A | 10/2008 |
| JP | 2012085500 | A | 4/2012 |
| KR | 1020130076112 | A | 7/2013 |
| WO | 9601516 | A1 | 1/1996 |
| WO | 2012142461 | A1 | 10/2012 |
| WO | 2020113336 | A1 | 6/2020 |

OTHER PUBLICATIONS

Japanese Office Action, Application No. JP2024523500; Completed: Mar. 7, 2025; Mailing Date: Mar. 18, 2025; 7 Pages.

Koepfinger et al.; IEEE guide for harmonic control and reactive compensation of static power converters Apr. 27, 1981; IEEE Standard; Piscataway, NJ.; 54 Pages.

International Search Respot and the Written Opinion of the International Searching Authority; Application No. PCT/EP2021 /078998; Completed: Jul. 5, 2022; Mailing Date: Jul. 14, 2022; 15 Pages.

L. Gyugyi et. al.; “The unified power flow controller: a new approach to power transmission control;” in IEEE Transactions on Power Delivery, vol. 10, No. 2, pp. 1085-1097, Apr. 1995; 13 Pages.

M. H. Abdel-Rahman et al; “New static var compensator control strategy and coordination with under-load tap changer;” in IEEE Transactions on Power Delivery, vol. 21, No. 3, pp. 1630-1635, Jul. 2006; 6 Pages.

Eurpoean Office Action; Application No. 21794576; Completed: May 8, 2025; 8 Pages.

* cited by examiner

STABILIZING ELECTRICAL POWER IN AN ELECTRICAL GRID

TECHNICAL FIELD

The invention relates to a method and system for stabilizing the electrical power in an electrical grid.

BACKGROUND OF THE INVENTION

In a weak electrical grid or an island grid, a load rejection caused by a grid fault or a fault of a large consumer like an electrical arc furnace or a large drive may lead to the increase of the frequency. This can lead to a trip of the power generators supplying the electrical grid and/or tripping of consumers. In both cases, valuable production time may be lost and the restart of the overall system may be time and cost intense.

Additionally, when harmonic filters are connected to the electrical grid for compensation of reactive power from e.g. large drives, arc furnaces or rectifier systems and the returns after a grid fault, this may lead to an overswing of the grid voltage due to reduced active and reactive power loading of the grid. This also may lead to a trip (switch off) of large electrical consumers, if the voltage variation is large enough. Specially drives are usually not very tolerant to overvoltages. Restarting of generators is typically a time-consuming issue.

WO 2020/113 336 A1 describes a method and system for stabilizing electrical power for arc furnaces and their power supplies. The method comprises causing a load to absorb power in response to determining a loss of arc event of an arc furnace electrode.

SUMMARY

It is an objective of the invention to reduce tripping of generators in an electrical grid and/or to reduce downtimes of consumers in the electrical grid.

These objectives are achieved by the subject-matter of the independent claims. Further exemplary embodiments are evident from the dependent claims and the following description.

A first aspect of the invention relates to a method for stabilizing electrical power in an electrical grid. The electrical grid may be a low (up to 1 kV), medium (up to 50 kV) and high (more than 50 kV) voltage grid. It may be the grid of a production facility or may be a large scale grid for supplying a large amount of consumers and production facilities. The electrical grid may be a three-phase grid.

According to an embodiment of the invention, the method comprises: detecting a reduced power demand in the electrical grid and determining an active power and a reactive power to be compensated in the electrical grid. Voltage and current in the electrical grid may be measured and the power demand may be determined therefrom. For example, the power over time provided by the electrical grid may be calculated and, when the power over time reduces suddenly, a reduced power demand may be assumed. It also may be that the current power demand of consumers and/or loads is reported to a controller performing the method and that these controllers sums up the reported power demands to determine power demand over time.

From measured voltage and the measured current in the electrical grid, also the active power and the reactive power in the electrical grid may be determined. When the voltage and the current are considered as complex numbers, the complex power is the product of voltage and the complex conjugate of the current. The active power (or real power) is the real part of the complex power. The reactive power is the imaginary part of the complex power.

According to an embodiment of the invention, the method further comprises: compensating at least a part of the active power and at least a part of the reactive power by controlling a power compensating circuit connected to the electrical grid. With the power compensating circuit, at least a part of the missing active and reactive power can be generated. In such a way, the reduced power can be balanced and the amplitude and frequency of the voltage in the grid can be stabilized.

The power compensating circuit comprises an at least resistive load connectable to the electrical grid via semiconductor switches. The at least resistive load may provide a resistance and optionally a capacity and/or impedance. An active power and a reactive power may be generated by connecting and disconnecting the at least resistive load to the electrical grid. This may be done with the frequency of the electrical grid.

A compensated active power and a compensated reactive power is adjusted by setting switching angles of the semiconductor switches with respect to a phase angle of a grid voltage in the electrical grid. Thus, not only the reduced active power, which may be caused by a tripped consumer and/or load, may be at least partially compensated, but also a changed reactive power, which for example may be caused by harmonic filters subjected to a frequency change of the voltage, may be at least partially compensated.

According to an embodiment of the invention, the semiconductor switches are thyristors and the switching angles are firing angles of the thyristors. Such firing angles may have a value between 0° and 180°. In the case of other actively controllable semiconductor switches, turn-on switching angles and turn-off switching angles may be determined.

According to an embodiment of the invention, the reduced power demand is detected by measuring a voltage and a current in the electrical grid and by calculating an electrical power from the measured voltage and the measured current. A controller for determining the reduced power and controlling the power compensating circuit may receive signals from voltage and current signals in the electrical grid. As already mentioned, from these signals over time, the active and reactive power can be calculated.

According to an embodiment of the invention, the power compensating circuit comprises a pair of antiparallel connected semiconductor switches for connecting and disconnecting two phases of the electrical grid. The at least resistive load is connected in series with the pair of antiparallel connected semiconductor switches. All pairs of phases of the electrical grid may be connected by a pair of antiparallel connected semiconductor switches and an at least resistive load. The pairs of antiparallel connected semiconductor switches may be delta-connected between the phases.

It also may be that pairs of antiparallel connected semiconductor switches are star-connected between the phases. In this case, each phase may be connected to a star-point via a pair of antiparallel connected semiconductor switches.

According to an embodiment of the invention, the power compensating circuit comprises an active rectifier with a half-bridge for each phase of the electrical grid, wherein the at least resistive load is connected in parallel to the half-bridges. A further possibility is to rectify the voltage in the electrical grid with an active rectifier, which may comprise a half-bridge for each phase. On the DC side, the rectified voltage may be applied to the at least resistive load.

Each half-bridge may comprise an upper and a lower semiconductor switch, where a phase of the grid is connected between the switches. On their other ends, the half-bridges are connected in parallel and provide the DC outputs of the rectifier. The switching angles of the upper and a lower semiconductor switch may be selected, such that the power compensating circuit provides a desired active power and reactive power.

According to an embodiment of the invention, the power compensating circuit comprises a transformer connected between the electrical grid and the semiconductor switches, which transformer has an adjustable transformation ratio. The transformer may comprise a tap changer with which the winding number of a winding of the transformer can be changed. The transformation ratio may be adjusted with the tap changer. In such a way, the voltage applied to the at least resistive load may be adjusted, which also may be used for controlling the active power and reactive power generated by the at least resistive load.

The compensated active power and the compensated reactive power is adjusted by setting the adjustable transformation ratio.

According to an embodiment of the invention, the power compensating circuit comprises a first rectifier and a second rectifier connected to the electrical grid. Both rectifiers may be connected via a transformer or directly to the electrical grid. The compensated active power and the compensated reactive power is adjusted by setting first switching angles for the first rectifier and corresponding different second switching angles for the second rectifier. The rectifier may be designed equal and the corresponding first and second switching angles may relate to the same semiconductor switch of the first and second rectifier, respectively.

According to an embodiment of the invention, the switching angles of upper semiconductor switches of half-bridges of the first converter are different from the switching angles of lower semiconductor switches of the half-bridges of the first converter. The switching angles of upper semiconductor switches of half-bridges of the second converter are equal to the switching angles of the lower semiconductor switches of the half-bridges of the second converter. The switching angles of lower semiconductor switches of the half-bridges of the second converter are equal to the switching angles of the upper semiconductor switches of the half-bridges of the first converter. Such a switching scheme may be called "split-alpha". The switching of the two rectifiers in this way results in rather low higher order harmonics, since the rectifiers are switched symmetrically with respect to negating the respective phase voltages. Furthermore, with this switching, scheme active power and reactive power may be controlled independently from each other.

According to an embodiment of the invention, the switching angles of upper semiconductor switches of half-bridges of the first converter are equal to the switching angles of lower semiconductor switches of the half-bridges of the first converter. The switching angles of upper semiconductor switches of half-bridges of the second converter are equal to the switching angles of lower semiconductor switches of the half-bridges of the second converter. The switching angles of the upper and lower semiconductor switches of the half-bridges of the first converter are different from the switching angles of the upper and lower semiconductor switches of the half-bridges of the second converter. In other words, the on-times of the semiconductor switches of the first rectifier may be different (i.e. different closing angle and/or different opening angle) from the on-times of the semiconductor switches of the second rectifier. Also with this switching scheme, active power and reactive power may be controlled independently from each other.

It has to be noted that all these switching angles are provided with respect to a zero crossing from negative to positive of the respective phase voltage of the electrical grid.

According to an embodiment of the invention, the first rectifier and the second rectifier are connected in series at their DC outputs and the at least resistive load is connected in parallel to the series connected DC outputs. It also may be that the first rectifier, the second rectifier and the at least resistive load are connected in parallel to the DC outputs of the first rectifier and the second rectifier. It also may be possible that a separate at least resistive load is connected to each rectifier, i.e. their DC outputs.

According to an embodiment of the invention, the first rectifier and the second rectifier are connected to the electrical grid via a transformer with a secondary winding for each rectifier. In such a way, when the first and second rectifier are switched symmetrically, higher order harmonics caused by the switching may compensate in the transformer.

A further aspect of the invention relates to a system for stabilizing electrical power in an electrical grid. It has to be understood that features of the method as described in the above and in the following may be features of the system as described in the above and in the following, and vice versa.

According to an embodiment of the invention, the system comprises the power compensating circuit, such as described above and below, and a controller for controlling the power compensating circuit, such as described above and below. The system is adapted for performing the method as described herein.

According to an embodiment of the invention, a harmonic filter is connected to the electrical grid. The system furthermore may comprise a harmonic filter, which may be a passive filter for filtering higher order harmonics caused by loads connected to the grid. The reactive power generated by the harmonic filter, when the active power demand reduces, may be compensated by the method.

According to an embodiment of the invention, at least one load is connected to the electrical grid, which, when being disconnected from the electrical grid, causes the reduced power demand. The at least one load comprises at least one of an electrical drive and an electrical arc furnace. An electrical drive may comprise a converter and an electrical motor and/or generator. It has to be noted that such a load may have an active power demand of more than 1 MW.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
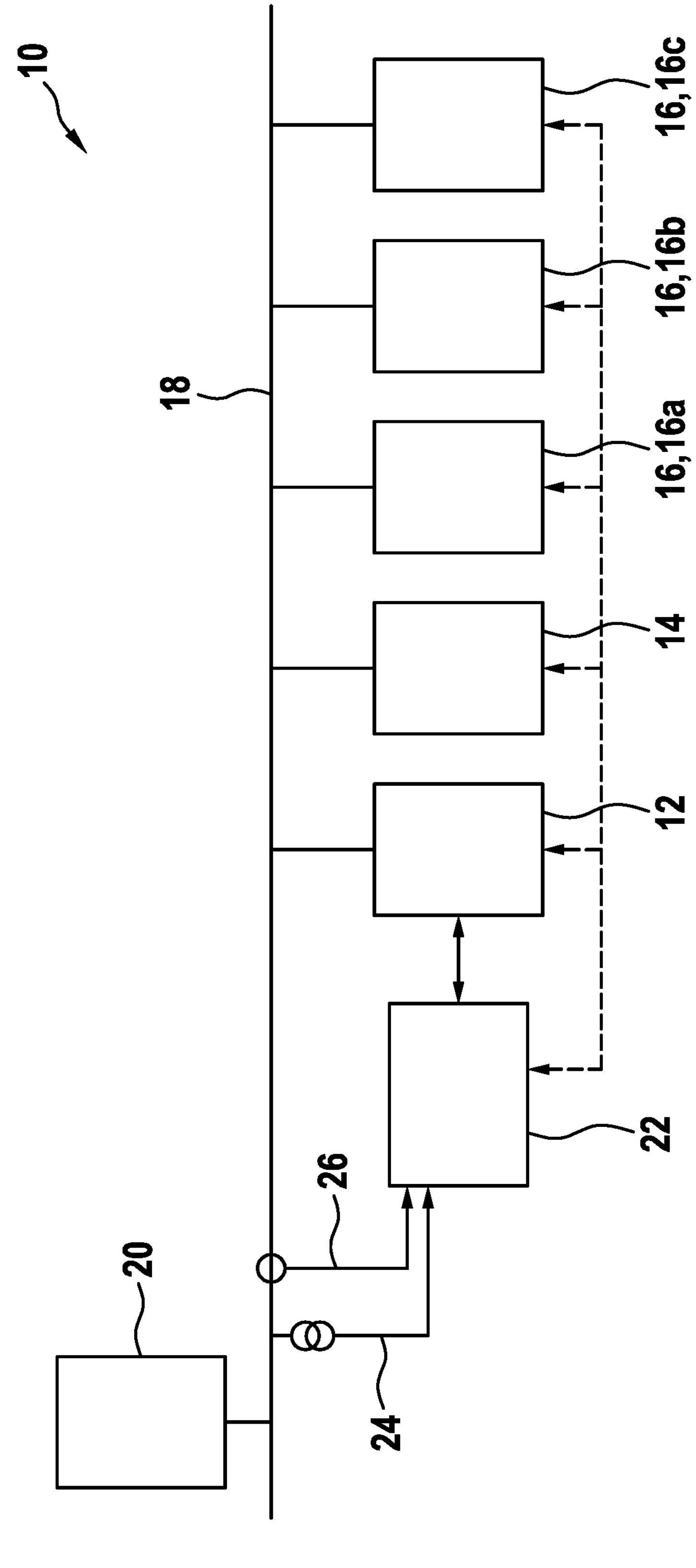
FIG. 1 schematically shows a system according to an embodiment of the invention.

FIG. 1 shows a system 10, which comprises a power compensating circuit 12, a harmonic filter 14 and several loads 16, such as an electric drive 16*a*, an electric DC or AC arc furnace 16*b*, and/or other large electrical loads 16*c*, which all are connected to an electrical grid 18. Large in this context may mean that the load may have a maximal power consumption of more than 1 MW. The electrical grid 18 may be a three-phase AC grid, for example with a voltage of 33 kV, i.e. it may be a medium voltage grid. One or more generators 20 may supply the electrical grid with electrical power.

FIG. 1 furthermore shows a controller 22 for the power compensating circuit 12, which controller 22 may be a part of a controller of the overall system 10 or of particular components of the system, such as one or more of the loads 16. The controller 22 receives voltage measurements 24 and current measurements 26 for the electrical grid 18. These measurements 24, 26 may be performed at an input of the system 10 and/or at an input of the loads 16. Based on these measurements and/or further data, the controller 22 controls the power compensating circuit 12. The controller 22 also may be communicatively connected to control devices and/or sensor of the filter 14 and/or one or more of the loads 16. Also, data received in this way may be used for controlling the power compensating circuit 12.

In general, based on the received data (such as the voltage measurements 24 and current measurements 26), the controller 22 determines, whether there is a power demand drop in the electrical grid 18 and controls the power compensating circuit 12 to balance or at least reduce this power demand drop. For example, the active power and the reactive power can be compensated in case of a load rejection of one of the loads 16 or a grid fault of the electrical grid 18, in particular, when the electrical grid 18 is weak or is in an island operation. This will prevent the electrical grid 18 from overvoltage and increasing of the frequency.

The controller 22 may be adapted for detecting disturbances and/or faults from one or more of the loads 16, or from the electrical grid 18, which may comprise overhead lines. Further faults and/or a detected power demand may be determined from a loss of arc at an electrical arc furnace 16*b* and a restrike within 100 ms to 1000 ms, a trip of a large electrical drive 16 and in general a trip of a large electrical load 16*c*.

The power compensating circuit 12 and the controller 22 are designed to simultaneously generated active power and reactive power, in particular to prevent a voltage overswing on the electrical grid 18 and to simultaneously prevent an increase in frequency. The voltage overswing and the increase in frequency may be caused by the one or more generators 20 still producing a large amount of power, while the power demand has dropped. This will prevent the loads 16 and the generators 20 from tripping and thus after the event, the system 10, such as a plant, mine or remote industrial area, will be able to continue its operation without any disturbances. This may prevent the system 10 from a restart. A trip and a restart may lead to a loss of production time.

In the case of a determined reduced power demand, such as a load rejection or grid fault, the power compensating circuit 12 can compensate not only the active/real power but also the changed reactive power. The reactive power may be changed due to the harmonic filter 14, which may comprise filter capacitances and filter inductances, which in the case of a changing voltage may change the reactive power.

The following FIGS. 2 to 5 show embodiments of power compensating circuits 12, which may be used in the system 10. It has to be noted that all these embodiments can be used in combination with a synchronous condenser connected to the electrical grid 18, which may be used for compensating the remaining reactive power, if needed.

Figure 2A:
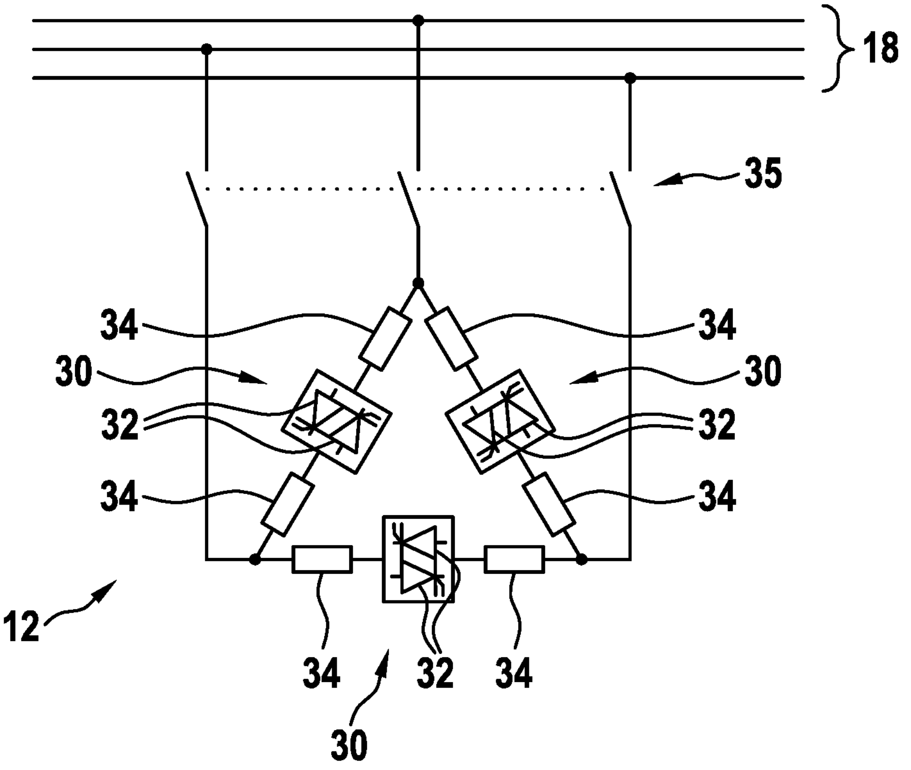
FIG. 2A schematically shows a power compensating circuit used in an embodiment of the invention.
Figure 2B:
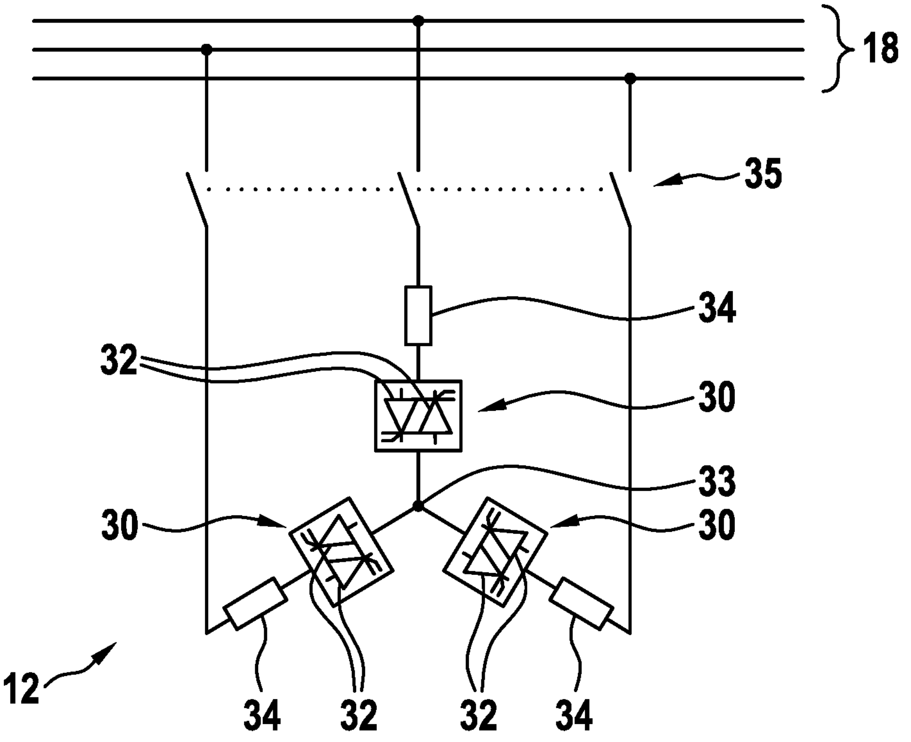
FIG. 2B schematically shows a power compensating circuit used in a further embodiment of the invention.

FIGS. 2A and 2B show a power compensating circuit 12 with three semiconductor switch arrangements 30, each of which comprises a pair of anti-parallel semiconductor switches 32. Here and in the following figures, the semiconductor switches 32 may be thyristors. However, also other types of semiconductor switches 32, such as IGBTs, are possible.

Each semiconductor switch arrangement 30 comprises a load 34, or, as shown in FIG. 2A, two loads 34 connected in series with the pair of anti-parallel semiconductor switches 32. The pair of anti-parallel semiconductor switches 32 is connected between the two loads 34. It also may be possible to arrange the loads 34 in a different way. Depending on the load arrangement, series and/or parallel connection of semiconductor switches 32 may be implemented. This applies also to the following embodiments.

Each load 34 is an at least resistive (or ohmic) load and can comprise reactive, i.e. capacitive and/or inductive, parts. Each load 34 may be passive, i.e. may be composed of resistors, capacitors and/or inductors. For example, each load 34 may be adapted for dissipating at least 0.1 MW. The properties of the loads 34 described with respect to FIG. 2 also apply to the following figures.

In FIG. 2A, each of the three semiconductor switch arrangements 30 is connected between a pair of phases of the electrical grid 18, i.e. the semiconductor switch arrangements 30 are delta-connected.

In FIG. 2B, each of the three semiconductor switch arrangements 30 is connected between one of the phases of the electrical grid 18 and star-point 33. The semiconductor switch arrangements 30 are star-connected.

In FIG. 2A, 2B and in the following figures, the active power and reactive power of the power compensating circuit 12 can be controlled by controlling the switching angles of the semiconductor switches 32 (or firing angles in the case of thyristors). As higher the switching angle for switching the semiconductor switch 32 conducting, as higher the reactive power. It has to be noted that also reactive power is generated, when the load 34 is purely resistive.

The power compensating circuit 12 also may comprise a mechanical switch 35 for connecting the power compensating circuit 12 to the electrical grid 18 and for completely disconnecting it therefrom.

Figure 3:
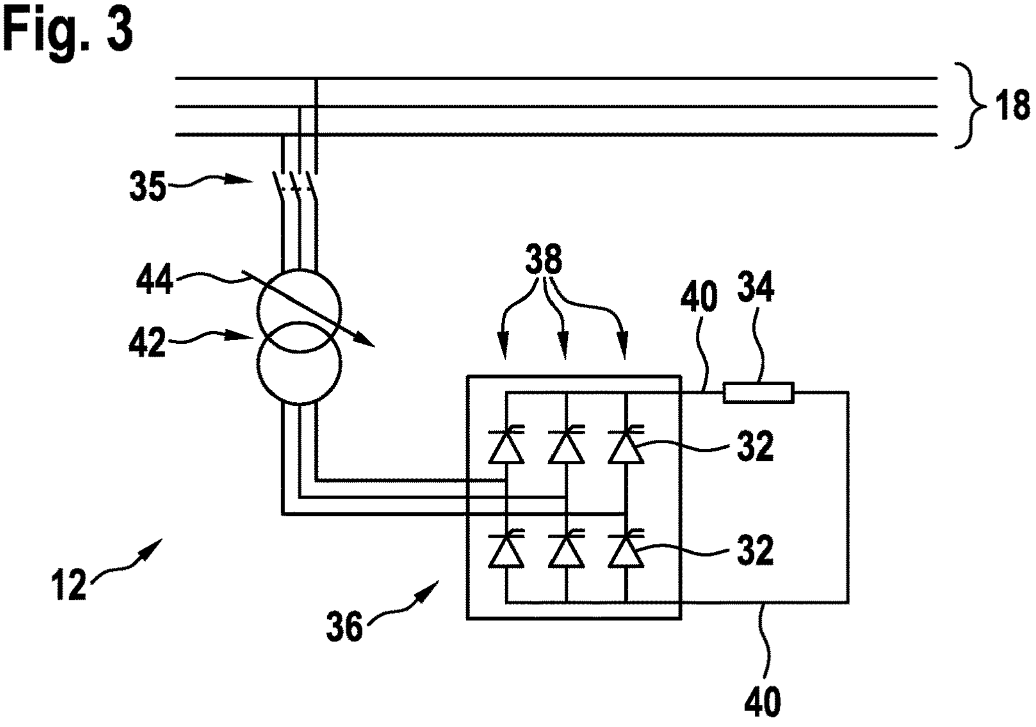
FIG. 3 schematically shows a power compensating circuit used in a further embodiment of the invention.

FIG. 3 shows a power compensating circuit 12, in which the load 34 is connected via a rectifier 36 with the electrical grid 18. The rectifier 36 comprises three half-bridges 38, each of which comprises two semiconductor switches 32, which are series-connected between DC outputs 40 of the half-bridges 38. A phase of the electrical grid is connected to a midpoint between the semiconductor switches 32. The DC outputs 40 are connected in parallel and the load 34 is connected between the DC outputs 40.

Again, the active power and reactive power of the power compensating circuit 12 can be controlled by controlling the switching angles of the semiconductor switches 32. In FIGS. 2 and 3, by solely changing the switching angles, the ratio between the provided active power and reactive power is predefined and may have be optimized for an expected operation point.

An optional transformer 42 may be connected between the electrical grid 18 and the rectifier 36. The transformer 42 may have an adjustable transformation ratio, for example via a tap changer 44. By changing the transformation ratio, also the ratio between active power and reactive power provided by the power compensating circuit 12 may be changed.

With the tap changer 44, power load changes can be considered depending on the available taps. Depending on the transformer tap position of the tap changer 44 and the switching angles of the semiconductor switches 32, the active power and the reactive power drawn by the power compensating circuit 12 is controllable more independently from each other. This allows to adapt two various operating points and/or is more flexible.

The transformer 42 also may be provided in FIG. 2, where it may be connected between the electrical grid 18 and the semiconductor switch arrangements 30.

Figure 4:
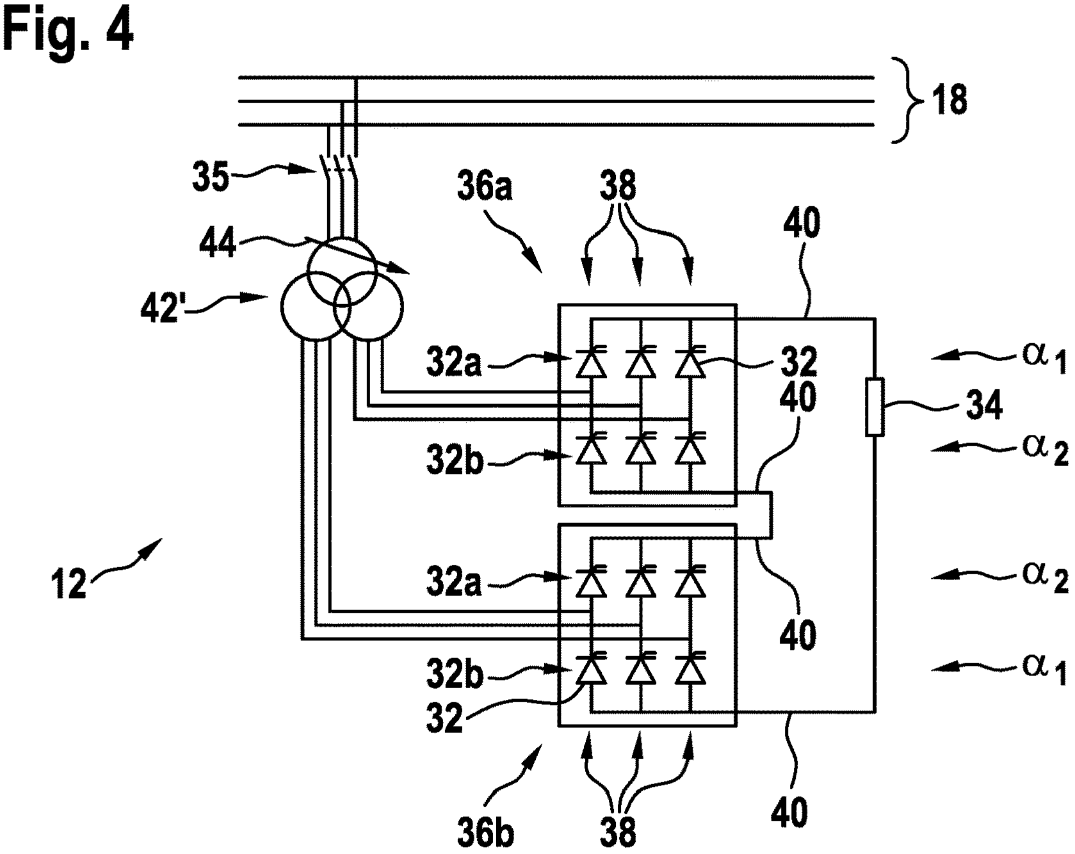
FIG. 4 schematically shows a power compensating circuit used in a further embodiment of the invention.

FIG. 4 shows a power compensating circuit 12, which comprises two rectifiers 36*a*, 36*b*, each of which is designed like in FIG. 3. Each of the rectifiers 36*a*, 36*b* is connected to a secondary winding of a transformer 42', which is connected via a primary winding to the electrical grid 18. The transformer 42' may have an adjustable transformation ratio, for example with the aid of a tap changer 44 like the transformer 42 of FIG. 3.

In FIG. 4, the rectifiers 36*a*, 36*b* are connected in series with their DC outputs 40 and the load 34 is connected in parallel to this series-connection.

Figure 5:
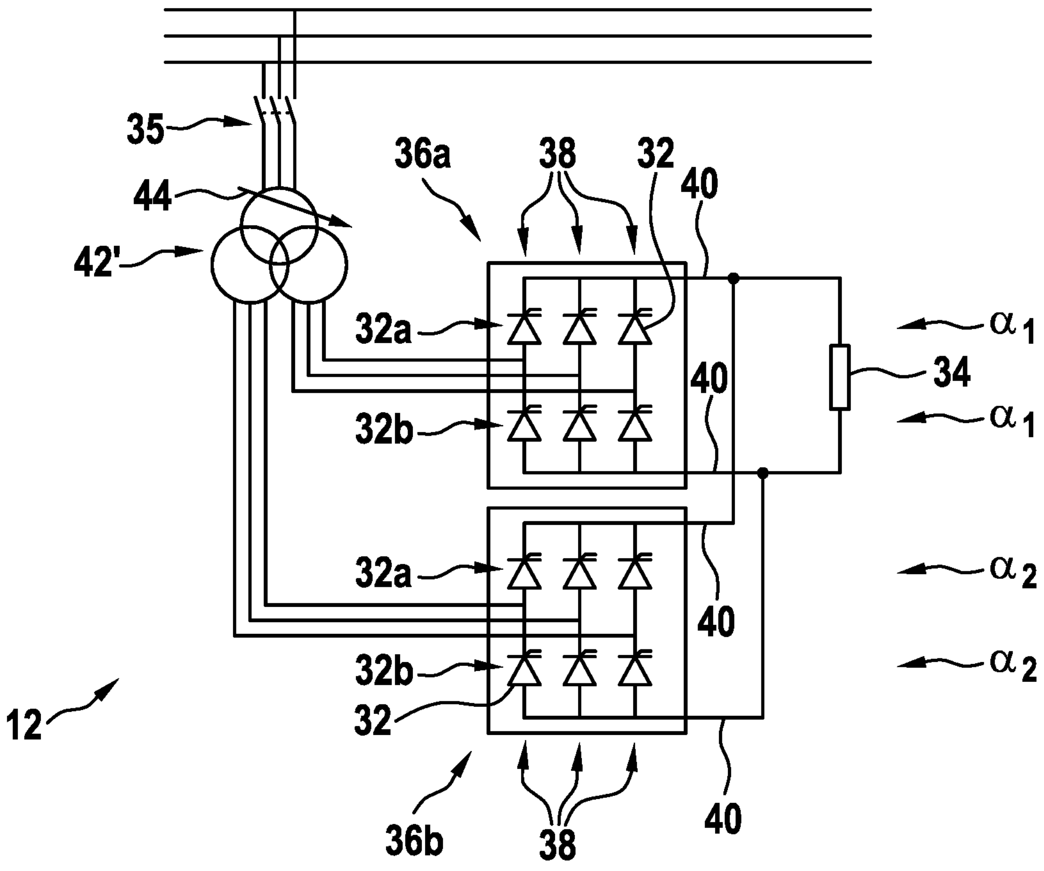
FIG. 5 schematically shows a power compensating circuit used in a further embodiment of the invention.

FIG. 5 shows a power compensating circuit 12 with two rectifiers 36*a*, 36*b* like in FIG. 5, which however are connected in parallel with their DC outputs 40. The load 34 is connected in parallel to the rectifiers 36*a*, 36*b*.

In FIGS. 4 and 5, the switching angles of the semiconductor switches 32 can be controlled, such that the reactive power can be adjusted within a certain range while the active power can be kept constant. This may be achieved by switching the rectifiers 36*a*, 36*b* asymmetrically. This may have the fastest response to transient disturbances.

As shown in FIG. 4, the semiconductor switches 32*a* of the upper half-bridge of rectifier 36*a* and the semiconductor switches 32*b* of the lower half-bridge of rectifier 36*b* may have the same switching angle $\alpha_1$ and the semiconductor switches 32*b* of the lower half-bridge of rectifier 36*a* and the semiconductor switches 32*a* of the upper half-bridge of rectifier 36*b* may have the same switching angle 2 (different from $\alpha_1$). This may be called split-alpha control.

As shown in FIG. 5, the semiconductor switches 32*a* of the upper half-bridge and the semiconductor switches 32*b* of the lower half-bridge of rectifier 36*a* may have the same switching angle $\alpha_1$ and the semiconductor switches 32*a* of the upper half-bridge and the semiconductor switches 32*b* of the lower half-bridge of rectifier 36*b* may have the same switching angle $\alpha_2$ (different from $\alpha_1$).

It is also possible that the switching scheme of FIG. 5 is applied to the power compensating circuit 12 of FIG. 4 and vice versa.

Figure 6:
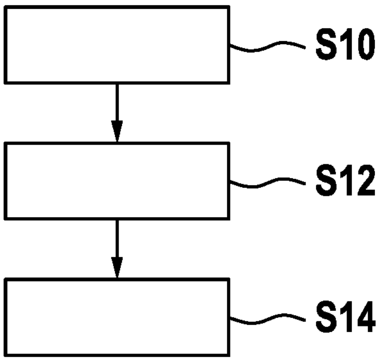
FIG. 6 shows a flow diagram for a method for stabilizing electrical power in an electrical grid according to an embodiment of the invention.

FIG. 6 shows a flow diagram with a method for stabilizing electrical power in the electrical grid 18 that may be performed by the system 10 under the control of the controller 22.

In step S10, the controller 22 detects a reduced power demand in the electrical grid 18. As described above, this may be done by measuring a voltage 24 and a current 26 in the electrical grid 18 and by calculating an electrical power from the voltage 24 and the current 26. Additionally or alternatively, the controller 22 determines a grid fault or other faults by evaluating the measurement data of the voltage 24 and the current 26. Additionally or alternatively, the controller 22 receives data from the loads 16, 16*a*, 16*b*, 16*c* and/or from the harmonic filter 14 that indicates a reduced power demand. Such data may comprise information that one of the loads 16, 16*a*, 16*b*, 16*c* has a fault and/or has tripped.

In step S12, the controller 22 determines an active power and a reactive power to be compensated in the electrical grid 18. For example, the controller determines the active and reactive power that was drawn from the electrical grid 18 before the reduced power demand has appeared. The active power to be compensated may be the difference between the active power before the appearance of the reduced power demand and the active power after that. Analogously, the reactive power to be compensated may be the difference between the reactive power before the appearance of the reduced power demand and the reactive power after that. It also may be that, when one of the loads 16 trips, the reduced power demand in active and reactive power is already stored in the controller 22 and is then used as active power and a reactive power to be compensated. A further possibility is that the reactive power generated by the harmonic filter 14 with respect to a specific voltage change in the grid is stored and/or may be calculated by the controller 22 and is then used as reactive power to be compensated.

In step S14, the controller 22 controls the power compensating circuit 12 to compensate at least a part of the active power and at least a part of the reactive power. The power compensating circuit 12 is controlled, such that the at least resistive load 34 is connected to the electrical grid 18 and disconnected from the grid 18 via the semiconductor switches 32, such that it generates the active power and the reactive power to be compensated.

In particular, the power compensating circuit 12 is controlled to not only compensate the active power but also the reactive power, which for example is generated by the harmonic filter 14. When the voltage returns after a fault, this prevents the system 10 from an overswing of the voltage due to missing reactive and active power and thus prevents a tripping of the loads 16, which may save the time for restarting the overall system 10.

The compensated active power and a compensated reactive power are adjusted and/or generated by correspondingly setting the switching angles $\alpha_1$, $\alpha_2$ of the semiconductor switches 32 of the power compensating circuit 12. The switching angles $\alpha_1$, $\alpha_2$ are set with respect to a phase angle of the grid voltage 24 in the electrical grid 18. For example, the switching angle for a specific semiconductor switch may be set to a specific angle after the zero crossing of the respective phase voltage of the electrical grid.

Additionally, when the power compensating circuit 12 comprises a transformer 42, 42' with an adjustable transformation ratio, the compensated active power and the compensated reactive power may be adjusted by setting the adjustable transformation ratio correspondingly.

When the power compensating circuit 12 comprises a rectifier 36, 36*a*, 36*b*, different switching schemes can be used to generate a desired active power and reactive power. For example, the rectifier 36 in FIG. 3 may be switched with different switching angles for the upper semiconductor switches 32*a* of and the lower semiconductor switches 32*b* of the half-bridges 38 of the rectifier 36. However, this may generate higher order harmonics in the electrical grid 18.

When two rectifiers 36*a*, 36*b* are used, the generation of harmonics may be balanced by switching the rectifiers 36*a*, 36*b* symmetrically, either with respect to each other (as shown with respect to FIG. 4) or each rectifier alone (as shown in FIG. 5). In general, in both cases, the compensated active power and the compensated reactive power are adjusted and/or generated by setting first switching angles $\alpha_1$, $\alpha_2$ for the first rectifier 36*a* and corresponding different second switching angles $\alpha_1$, $\alpha_2$ for the second rectifier 36*b*.

A first possibility is switching the rectifiers with the control scheme called "split-alpha". The switching angles $\alpha_1$ of upper semiconductor switches 32*a* of the half-bridges 38 of the first converter 36*a* are selected to be different from the switching angles $\alpha_2$ of the lower semiconductor switches 32*b* of the half-bridges 38 of the first converter 36*a*. The switching angles $\alpha_2$ of the upper semiconductor switches 32*a* of the half-bridges 38 of the second converter 36*b* are set equal to the switching angles $\alpha_2$ of the lower semiconductor switches 32*b* of the half-bridges 38 of the second converter 36*b*. The switching angles $\alpha_1$ of the lower semiconductor switches 32 of the half-bridges 38 of the second converter 36*b* are set equal to the switching angles $\alpha_1$ of the upper semiconductor switches 32*a* of the half-bridges 38 of the first converter 36*a*.

A second possibility is to use the same switching angles $\alpha_1$, $\alpha_2$ for the upper and lower semiconductor switches 32*a*, 32*b* for each rectifier 36*a*, 36*b*, but to use different switching angles $\alpha_1$, $\alpha_2$ for the rectifier 36*a*, 36*b*. The switching angles $\alpha_1$ of the upper semiconductor switches 32*a* of the half-bridges 38 of the first converter 36*a* are selected to be equal to the switching angles $\alpha_1$ of the lower semiconductor switches 32*b* of the half-bridges 38 of the first converter 36*a*. The switching angles $\alpha_2$ of the upper semiconductor switches 32*a* of the half-bridges 38 of the second converter 36*b* are selected to be equal to the switching angles $\alpha_2$ of the lower semiconductor switches 32*b* of the half-bridges 38 of the second converter 36*b*. The switching angles $\alpha_1$ of the upper and lower semiconductor switches 32*a*, 32*b* of the half-bridges 38 of the first converter 36*a* are selected to be different from the switching angles $\alpha_2$ of the upper and lower semiconductor switches 32*a*, 32*b* of the half-bridges 38 of the second converter 36*b*.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for stabilizing electrical power in an electrical grid, the method comprising:

detecting a reduced power demand in the electrical grid;

determining an active power and a reactive power to be compensated in the electrical grid;

compensating at least a part of the active power and at least a part of the reactive power by controlling a power compensating circuit connected to the electrical grid;

wherein the power compensating circuit includes at least resistive load connectable to the electrical grid via semiconductor switches;

wherein a compensated active power and a compensated reactive power is adjusted by setting switching angles of the semiconductor switches with respect to a phase angle of a grid voltage in the electrical grid.

2. The method of claim 1, wherein the semiconductor switches are thyristors and the switching angles are firing angles of the thyristors.

3. The method of claim 1, wherein the reduced power demand is detected by measuring a voltage and a current in the electrical grid and by calculating an electrical power from the voltage and the current.

4. The method of one of claim 1, wherein the power compensating circuit comprises a pair of antiparallel connected semiconductor switches for connecting and disconnecting two phases of the electrical grid;

wherein the at least resistive load is connected in series with the pair of antiparallel connected semiconductor switches.

5. The method of claim 1, wherein the power compensating circuit comprises an active rectifier with a half-bridge for each phase of the electrical grid;

wherein the at least resistive load is connected in parallel to the half-bridges.

6. The method of claim 1, wherein the power compensating circuit comprises a transformer connected between the electrical grid and the semiconductor switches, which transformer has an adjustable transformation ratio;

wherein the compensated active power and the compensated reactive power is adjusted by setting the adjustable transformation ratio.

7. The method of claim 6, wherein the transformer comprises a tap changer.

8. The method of claim 1, wherein the power compensating circuit comprises a first rectifier and a second rectifier connected to the electrical grid;

wherein the compensated active power and the compensated reactive power are adjusted by setting first switching angles for the first rectifier and corresponding different second switching angles for the second rectifier.

9. The method of claim 8, wherein the switching angles of upper semiconductor switches of half-bridges of a first converter are different from the switching angles of lower semiconductor switches of the half-bridges of the first converter;

wherein the switching angles of upper semiconductor switches of half-bridges of a second converter are equal to the switching angles of the lower semiconductor switches of the half-bridges of the second converter;

wherein the switching angles of lower semiconductor switches of the half-bridges of the second converter are equal to the switching angles of the upper semiconductor switches of the half-bridges of the first converter.

10. The method of claim 8, wherein the switching angles of upper semiconductor switches of half-bridges of the first converter are equal to the switching angles of lower semiconductor switches of the half-bridges of the first converter;

wherein the switching angles of upper semiconductor switches of half-bridges of the second converter are equal to the switching angles of lower semiconductor switches of the half-bridges of the second converter;

wherein the switching angles of the upper and lower semiconductor switches of the half-bridges of the first converter are different from the switching angles of the upper and lower semiconductor switches of the half-bridges of the second converter.

11. The method of one of claim 8, wherein the first rectifier and the second rectifier are connected in series at their DC outputs and the at least resistive load is connected in parallel to the series connected DC outputs; or wherein the first rectifier, the second rectifier and the at least resistive load are connected in parallel via the DC outputs of the first rectifier and the second rectifier.

12. The method of one of claim 8, wherein the first rectifier and the second rectifier are connected to the electrical grid via a transformer with a secondary winding for each rectifier.

13. A system for stabilizing electrical power in an electrical grid, the system comprising:

the electrical grid;

a power compensating circuit connected to the electrical grid;

a controller for controlling the power compensating circuit;

wherein the system is adapted for performing a method including:

detecting a reduced power demand in the electrical grid;

determining an active power and a reactive power to be compensated in the electrical grid;

compensating at least a part of the active power and at least a part of the reactive power by controlling a power compensating circuit connected to the electrical grid;

wherein the power compensating circuit includes at least resistive load connectable to the electrical grid via semiconductor switches;

wherein a compensated active power and a compensated reactive power is adjusted by setting switching angles of the semiconductor switches with respect to a phase angle of a grid voltage in the electrical grid.

14. The system of claim 13, further comprising:

a harmonic filter connected to the electrical grid.

15. The system of claim 13, further comprising:

at least one load connected to the electrical grid, which, when being disconnected from the electrical grid, causes the reduced power demand;

wherein the at least one load comprises at least one of an electrical drive and an electrical arc furnace.

16. The method of claim 2, wherein the reduced power demand is detected by measuring a voltage and a current in the electrical grid and by calculating an electrical power from the voltage and the current.

17. The method of claim 2, wherein the power compensating circuit comprises a pair of antiparallel connected semiconductor switches for connecting and disconnecting two phases of the electrical grid;

wherein the at least resistive load is connected in parallel to half-bridges.

18. The method of claim 2, wherein the power compensating circuit comprises an active rectifier with a half-bridge for each phase of the electrical grid;

wherein the at least resistive load is connected in parallel to the half-bridges.

19. The method of claim 2, wherein the power compensating circuit comprises a transformer connected between the electrical grid and the semiconductor switches, which transformer has an adjustable transformation ratio;

wherein the compensated active power and the compensated reactive power is adjusted by setting the adjustable transformation ratio.

20. The method of claim 2, wherein the power compensating circuit comprises a first rectifier and a second rectifier connected to the electrical grid;

wherein the compensated active power and the compensated reactive power are adjusted by setting first switching angles for the first rectifier and corresponding different second switching angles for the second rectifier.

* * * * *